Nov. 11, 1930.  G. W. FORD  1,781,501
CAMERA AND OTHER OPTICAL PROJECTION DEVICE
Filed Feb. 25, 1928
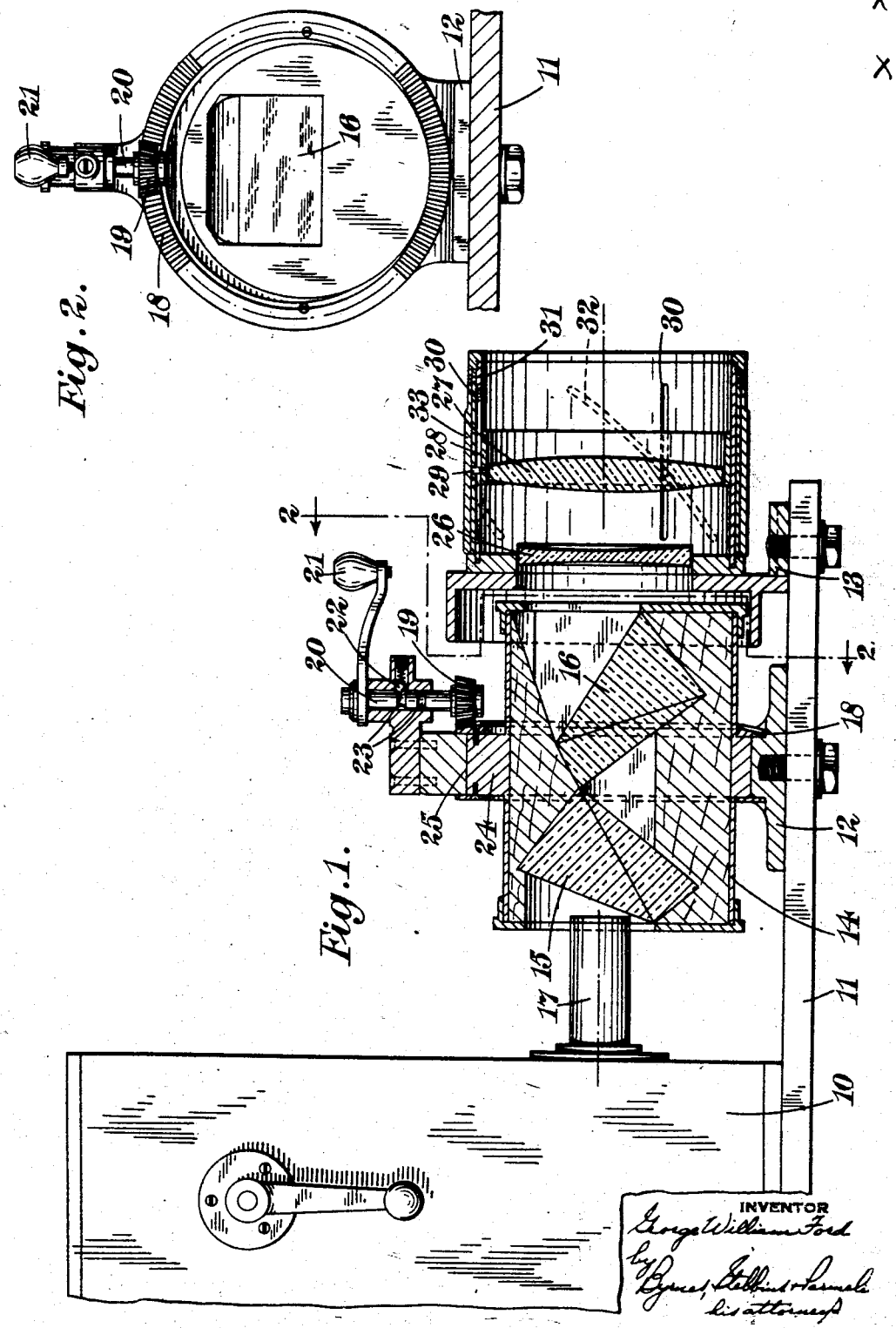

Patented Nov. 11, 1930

1,781,501

UNITED STATES PATENT OFFICE

GEORGE WILLIAM FORD, OF BRIGHTON, ENGLAND, ASSIGNOR TO HERBERT GEORGE PONTING, OF LONDON, ENGLAND

CAMERA AND OTHER OPTICAL PROJECTION DEVICE

Application filed February 25, 1928, Serial No. 256,882, and in Great Britain March 6, 1926.

This application is a continuation in part of my copending application Serial No. 148,378, filed November 15th, 1926, and has for its object to provide a novel construction and arrangement of optical device whereby it is possible to produce by photography or by kinematography distorted reproductions of an object or scene, and also to effect the projection of such distorted reproductions. These distorted pictures may be either humorous or dramatic or may be of a practical value.

It is well known that if a prism be interposed in the line of sight of an observer viewing an object, or into the beam of an image-projecting lens, a distorted picture is seen owing to the refraction produced by the prism, but it has not hitherto been possible to make photographic reproductions, and particularly kinematograph photographs of such distorted pictures. The principal reason is that the use of a prism in this manner produces chromatic abberation so that it is not possible to obtain an image which is sufficiently sharp for satisfactory photographic reproduction, whilst in the case of kinematograph pictures which are usually enlarged in projection to a very considerable extent, the blurring is so great as to render them of no commercial value whatsoever. The principal object of this invention is to provide an optical device which renders it possible to obtain critically sharp reproductions of objects or scenes which are distorted by means of a prism.

A preferred construction of this invention is illustrated in the accompanying drawings, in which—

Figure 1 is a central vertical section; and
Figure 2 is a view on the line 2—2 of Figure 1 looking towards the left of that figure.

In the accompanying drawings, the device is shown arranged for use with a kinematograph camera which is indicated generally by the reference 10. This camera is mounted on a suitable base 11 upon which are secured two standards 12, 13. The standard 12 contains the refracting prisms and the standard 13 contains a combination of lenses which are adjustable so as to ensure that for objects or scenes at any distance from the camera the light entering the prism system is a parallel axial beam or substantially so.

A suitable cylindrical casing 14 constitutes the mount for the refracting prisms of which two are used, these being indicated respectively at 15 and 16. Each prism is constructed as a compound prism so as to render the system achromatic, and they are arranged substantially in the manner shown in the drawing, so that one of them, viz. the prism 16 which is the more remote from the camera lens 17, has its central plane inclined thereto at an angle such that the deviation imparted to the rays by the prism 16 is substantially greater than the minimum deviation of the prism. The prism 15 has its central plane more nearly normal to the optical axis of the system.

The casing 14 wherein the prisms are mounted is made rotatable so that the distortion imparted to a picture may be varied. With the prisms in the position shown in Figure 1 the vertical dimensions of the image are reduced whilst the lateral dimensions remain unchanged. By rotating the casing 14 the direction in which the reduction in dimensions takes place may be adjusted at will. A toothed rack 18 is mounted on the casing 14 and is engaged by a hand-operated pinion 19 to effect the rotation. A graduated scale and pointer are provided on suitable parts of the casing and its mount so that a record can be kept of the particular settings and any particular effect reproduced at will. The pinion 19 is mounted on a shaft 20 which carries at its upper end the operating handle 21, and this shaft is adjustable vertically so that the pinion 19 can be disengaged from the rack 18 at will if it be desired to impart very rapid rotation to the casing 14. A spring-pressed ball-detent 22 engages one or other of two grooves 23 formed on the spindle 20 to retain it in either position to which it is adjusted.

The casing 14 may be arranged eccentrically in its mount 24 which rotates on the surface 25 in the stand 12, and this arrangement permits a reduction in the size of the prisms for the production of kinematograph pictures (which are oblong in shape) without introducing any cut-off at the margins of the pictures in either position.

The lens system which is mounted on the stand 13 is a parallelizing attachment consisting of two lenses, a fixed bi-concave lens 26 and an adjustable bi-convex lens 27. These lenses are of equal curvatures and the lens 27 is adjustable along the optical axis towards and away from the lens 26. This is effected by providing its mount 28 with radially-projecting pins 29 which engage parallel axial slots 30 in the fixed casing 31, to constitute guides and inclined slots 32 in an outer rotatable sleeve 33. Rotation of the sleeve 33 traverses the pins along the slots 30 and thereby traverses the lens along the optical axis of the system.

In the use of this device for taking distorted kinematograph pictures, the parts are assembled in the manner illustrated in Figure 1 and the lens 27 is adjusted so as to give a critically sharp image. The pictures may be taken with the prism system stationary, in which case they are all distorted in the same manner, or the prism system may be rotated intermittently or continuously as desired, to produce any desired distortion effects.

A particular arrangement of prisms which has proved satisfactory in use is one in which the angle of the prism 15 is about 20° and its central plane is inclined at an angle of about 60° to the optical axis of the system. The angle of the prism 16 is about 22° and its central plane is inclined at an angle of about 140° to the optical axis. It will be obvious to those versed in the art that these figures are not definitive, for variations can be made therefrom, and in fact in assembling the apparatus slight adjustments will usually be needed in order to produce the best results.

The combination of prisms and parallelizing lenses above described may be constructed as a unit for attachment to any camera or optical viewing or projection device, or may be incorporated therewith in a unitary construction, and the particular advantage of the aforesaid combination of prisms and parallelizing lenses is that it is possible to produce distorted images which are suitable for photographic reproduction or projection, such images being capable of accurate focussing to a critical sharpness which has not been possible heretofore with any system of prisms used for the production of distorted pictures.

I claim:—

1. A device for producing distorted pictures comprising the combination of a pair of oppositely-directed prisms and a parallelizing lens attachment comprising a bi-concave lens, a bi-convex lens, a casing containing said lenses, a mount slidable longitudinally in said casing and carrying said bi-convex lens, radial pins on said mount, means guiding said pins longitudinally of said casing, and a sleeve rotatable on said casing and having inclined slots adapted to engage said pins.

2. A device for producing distorted pictures comprising in combination two achromatic prisms whereof one is inclined to the optical axis of the system at a greater angle and in the opposite direction from the other, a casing containing said prisms, a circular rack on said casing, a manually rotatable shaft, a pinion on said shaft engaging said rack, means for retaining said pinion at will out from engagement with said rack, and a parallelizing lens combination situated in front of said prisms.

In testimony whereof I affix my signature.

GEORGE WILLIAM FORD.